(12) United States Patent
Dori-Hacohen et al.

(10) Patent No.: US 10,949,620 B2
(45) Date of Patent: Mar. 16, 2021

(54) METHODS FOR AUTOMATED CONTROVERSY DETECTION OF CONTENT

(71) Applicant: UNIVERSITY OF MASSACHUSETTS, Boston, MA (US)

(72) Inventors: Shiri Dori-Hacohen, Granby, MA (US); James Allan, Amherst, MA (US); John Foley, Northampton, MA (US); Myung-ha Jang, Amherst, MA (US)

(73) Assignee: UNIVERSITY OF MASSACHUSETTS, Boston, MA (US)

( * ) Notice: Subject to any disclaimer, the term of this patent is extended or adjusted under 35 U.S.C. 154(b) by 36 days.

(21) Appl. No.: 16/339,234

(22) PCT Filed: Oct. 6, 2017

(86) PCT No.: PCT/US2017/055637
§ 371 (c)(1),
(2) Date: Apr. 3, 2019

(87) PCT Pub. No.: WO2018/068002
PCT Pub. Date: Apr. 12, 2018

(65) Prior Publication Data
US 2019/0294677 A1    Sep. 26, 2019

Related U.S. Application Data

(60) Provisional application No. 62/404,839, filed on Oct. 6, 2016.

(51) Int. Cl.
*G06F 40/44* (2020.01)
*G06F 40/30* (2020.01)
(Continued)

(52) U.S. Cl.
CPC .............. *G06F 40/30* (2020.01); *G06F 15/16* (2013.01); *G06F 40/20* (2020.01)

(58) Field of Classification Search
CPC ...... G06F 40/20; G06F 16/3344; G06F 40/10; G06F 16/30; G06F 16/3346; G06F 40/14;
(Continued)

(56) References Cited

U.S. PATENT DOCUMENTS 7,702,508 B2    4/2010  Bennett et al.
9,336,192 B1    5/2016  Barba et al.
(Continued)

OTHER PUBLICATIONS

Y. Choi, Y. Jung, and S.-H. Myaeng. Identifying controversial issues and their sub-topics in news articles. In Intelligence and Security Informatics. Springer, 2010.
(Continued)

*Primary Examiner* — Huyen X Vo
(74) *Attorney, Agent, or Firm* — Hamilton, Brook, Smith & Reynolds, P.C.

(57) ABSTRACT

A probabilistic framework to detect controversy on the web. The prior kNN-WC algorithm is recast into a theoretical framework and a new language model introduced. Language models are constructed that are used to calculate probabilities. The probabilities are compared to determine whether or not a certain document is controversial.

12 Claims, 6 Drawing Sheets

(51) Int. Cl.
G06F 15/16 (2006.01)
G06F 40/20 (2020.01)
(58) Field of Classification Search
CPC ...... G06F 40/216; G06F 40/30; G06F 40/205; G06F 40/242; G06F 40/279; G06F 16/382; G06F 7/08; G06F 16/285; G06F 16/313; G06F 16/3334; G06F 16/353; G06F 16/355; G06F 16/24578; G06F 16/00; G06F 16/22; G06F 16/24575; G06F 16/35; G06F 16/288; G06F 16/93; G06F 16/3347
See application file for complete search history.

(56) References Cited

U.S. PATENT DOCUMENTS

| | | | | |
|---|---|---|---|---|
| 2006/0184354 | A1* | 8/2006 | Huang | G10L 15/197 704/6 |
| 2008/0052078 | A1 | 2/2008 | Bennett et al. | |
| 2012/0136985 | A1* | 5/2012 | Popescu | G06Q 10/10 709/224 |
| 2012/0158626 | A1* | 6/2012 | Zhu | H04L 63/1408 706/13 |
| 2013/0185361 | A1* | 7/2013 | Balasubramanian | H04L 51/12 709/206 |
| 2016/0078472 | A1* | 3/2016 | Asur | G06Q 30/0245 705/14.44 |
| 2017/0060997 | A1* | 3/2017 | Lee | G06F 16/3344 |
| 2019/0303784 | A1 | 10/2019 | Jang et al. | |

OTHER PUBLICATIONS

D. Corney, D. Albakour, M. Martinez, and S. Moussa. What do a million news articles look like? In Workshop on Recent Trends in News IR, ECIR'16.
P. A. Cramer. Controversy as news discourse, vol. 19. Springer Science & Business Media, 2011.
S. Das, A. Lavoie, and M. Magdon-Ismail. Manipulation among the arbiters of collective intelligence: how wikipedia administrators mold public opinion. In CIKM'13.
S. Dori-Hacohen and J. Allan. Automated controversy detection on the web. in ECIR'15.
Y. Mejova, A. X. Zhang, N. Diakopoulos, and C. Castillo. Controversy and sentiment in online news. arXiv preprint arXiv:1409.8152, 2014.
E. Pariser. The Filter Bubble: What the Internet Is Hiding from You. 2011.
H. Roitman, S. Hummel, E. Rabinovich, D. Sznajder, N. Slonim, and E. Aharoni. On the Retrieval of Wikipedia Articles Containing Claims on Controversial Topics. WWW '16 Companion Proceedings of the 25th International Conference Companion on World Wide Web, pp. 991-996.
T. Rose, M. Stevenson, and M. Whitehead. The Reuters Corpus vol. 1. in LREC 2002.
T. Yasseri, R. Sumi, A. Rung, A. Kornai, and J. Kertesz. Dynamics of conflicts in wikipedia. PloS one, 7(6):e38869, 2012.
International Search Report for PCT/US2017/055637, US International Search Authority, dated Dec. 15, 2017.
European Extended Search Report for Application No. 17859289.5, entitled "Methods for Automated Controversy Detection of Content," dated May 13, 2020.
M. Jang et al., Oct. 24, 2016. "Probabilistic Approaches to Controversy Detection," in CIKM.
M. Jang et aL, Jul. 7, 2016. "Improving Automated Controversy Detection on the Web"; SIGIR.
S. Dori-Hacohen et al., Jul. 7, 2016; "Controversy Detection in Wikipedia Using Collective Classification"; SIGIR.
L. Amendola et al., "The evolving perception of controversial movies," Palgrave Communications 1 (2015), pp. 1-9.
R. Awadallah et al., "Harmony and Dissonance: Organizing the People's Voices on Political Controversies," New York (Feb. 2012), 523-532.
E. Borra et al., "Societal Controversies in Wikipedia Articles," Proceedings of the 33rd Annual ACM Conference on Human Factors in Computing Systems—CHI 2015 (2015), pp. 193-196.
U. Brandes et al., 2009. "Network analysis of collaboration structure in Wikipedia," WWW 2009 Madrid!, pp. 131-740.
L. Cedroni. 2010. "Voting Advice Applications in Europe: A Comparison," Voting Advice Applications in Europe: -e State of Art (2010), 247-258.
Z. Chen and J. Berger. 2013. "When, Why, and How Controversy Causes Conversation," Journal of Consumer—Research 40, 3 (2013), 580-593.
M. Coletto et al., 2016. "Polarized user and topic tracking in twitter," in SIGIR. ACM, 945-948.
Marcelo Dascal, "Epistemology, Controversies, and Pragmatics," Isegona 12, 8-43 (1995).
S. Dori-Hacohen and J. Allan. 2013. "Detecting controversy on the web," in CIKM '13, Oct. 27-Nov. 1, 2013, San Fransisco, California.
F. H. V. Eemeren and B. Garssen. 2008. "Controversy and confrontation: Relating controversy analysis with argumentation theory," vol. 6. John Benjamins Publishing.
K. Garimella et al., "Quantifying controversy in social media," WSDM (2016).
D. J. Helfand. 2016. "A Survival Guide to the Misinformation Age: Scientific Habits of Mind," Columbia University Press.
C. Holdemess. "What Colors Are This Dress?" (2015). https://www.buzzfeed.com/catesish/help-am-i-going-insane-its-definitely-blue.
A. Kittur et al., "He says, she says: conflict and coordination in Wikipedia," in CHI 2207 Proceedings, Apr. 28-May 3, 2007, San Jose, California.
M. Klenner et al., "Verb Polarity Frames: a New Resource and its Application in Target-specific Polarity Classification," Proceedings of Konvens, 2014, pp. 106-115.
A.I. Leshner. 2015. "Bridging the opinion gap," Science 347, 6221 (2015), 459.
Pew Research Center. 2015. "An Elaboration of AAAS Scientists' Views," Technical Report.
Pew Research Center. 2015. "Public and Scientists' Views on Science and Society," Technical Report.
H. S. Rad and D. Barbosa. 2012. "Identifying controversial articles in Wikipedia: A comparative study," In WikiSym '12. ACM.
R. Sumi et al., 2011. "Edit Wars in Wikipedia," in 2011 IEEE Third Int'l Conference on Social Computing.
The Electoral Comission. 2016. EU referendum results. (2016).
B. Timmermans et al., 2017. "ControCurator: Understanding Controversy Using Collective Intelligence," Collective Intelligence (2017).
A. M Wilson and G. E Likens. 2015. "Content volatility of scientific topics in Wikipedia: A cautionary tale," PLoS ONE 10, 8 (2015), 10-14.
T. Yasseri et al., 2014. "The most controversial topics in Wikipedia: A multilingual and geographical analysis," in Global Wikipedia: International and cross-cultural issues in collaboration. 178.

\* cited by examiner

FIGURE 3

| Method | WCF | AUC |
|---|---|---|
| kNN-WC model | M | 0.733 |
| kNN-WC model | C | 0.743 |
| kNN-WC model | D | 0.500† |
| LM | M | 0.801 |
| LM | C | 0.835 |
| LM | D | 0.795 |

FIGURE 4

| Expansion Dataset | Type | \|C\| | AUC |
|---|---|---|---|
| DBPedia | Wiki | 4.6M | 0.853 |
| ClueWeb09B (Spam60) | Web | 33.8M | 0.741 |
| Reuters | News | 0.8M | 0.745 |
| NYT-LDC | News | 1.8M | 0.710 |
| Robust04 | News | 0.5M | 0.711 |
| Signal-1M | News | 1M | 0.710 |

FIGURE 5

| Query to build $D_C$ | AUC |
|---|---|
| controversy | 0.856 |
| Roitman | 0.823 |
| dispute | 0.740 |
| scandal | 0.721 |
| Mejova | 0.698 |
| saga | 0.500 |

FIGURE 6

| Method | Document | AUC |
|---|---|---|
| Roitman Lexicon | TF10 | 0.543 |
| Mejova Lexicon | TF10 | 0.562 |
| Mejova Lexicon | Full | 0.615 |
| Roitman Lexicon | Full | 0.695 |
| Cramer Language Model | Full | 0.783 |
| WCF Language Model | Full | 0.823* |
| WCF Language Model | TF10 | 0.835* |
| Cramer Language Model | TF10 | 0.856* |

METHODS FOR AUTOMATED CONTROVERSY DETECTION OF CONTENT

CROSS-REFERENCE TO RELATED APPLICATIONS

This invention claims priority to U.S. Provisional Patent Application Ser. No. 62/404,839 filed Oct. 6, 2016, incorporated by reference in its entirety.

STATEMENT REGARDING FEDERALLY SPONSORED RESEARCH

This invention was made with government support under IIS-0910884 and IIS-1217281 awarded by The National Science Foundation. The government has certain rights in the invention.

FIELD OF THE INVENTION

The invention is generally related to automatically detecting content discussing or related to controversial topics. More specifically the invention is related to automatically detecting content directed to controversial topics on the World Wide Web (WWW) and communicating to a user that the content is identified as controversial.

BACKGROUND OF THE INVENTION

Controversy is a prolonged public disagreement or a state of prolonged public dispute or debate, usually concerning a matter of conflicting opinion or point of view. Examples of controversial subjects or topics include but are not limited to politics, religion, philosophy, and parenting.

On the World Wide Web (WWW), electronic documents (i.e., webpages) provide differing perspectives, and not always trustworthy, on a particular topic making them "controversial". However, not all users may be aware that the topic is controversial. For example, alternative medicine websites appear alongside pediatrician advice websites, the phrase "global warming is a hoax" is in wide circulation, and political debates rage in many nations over economic issues, same-sex marriage and healthcare.

More particularly, parents seeking information about vaccines will find plenty of "proof" that they cause autism, and may not even realize the depth of the controversy involved; ads for helplines displayed to users searching for "abortion" may be discreetly funded by pro-life (anti-abortion) religious groups. Users searching for these topics may not even be aware that a controversy exists; indeed, without the aid of a search engine feature or browser extension to warn them, they may never find out.

Complicating matters is what is known as the "filter bubble" in which personalization is used to "cherry-pick" results in order to tailor results to the user's opinions. Automatic and social systems guide readers toward what they expect, feeding into confirmation bias rather than encouraging them to seek the multiple perspectives available on a subject. For example, those against gun rights will surely find material supporting this position (the tragedy of school shootings), whereas those for gun rights will find other evidence (the Second Amendment in the U.S.). At the same time, people searching for Issels Treatment will find a convincing web site describing this "comprehensive immunotherapy for cancer", but considered a "dubious treatment" by others.

Although Wikipedia—an online content source created and edited by volunteers around the world—provides a list of controversial issues such as abortion, gun control, poverty, and racism (en.wikipedia.org/wiki/Wikipedia:List_of_controversial_issues), most content sources including search engines are unlikely to reveal controversial topics to users unless they already know about them. Thus, there is an increasing call for content sources to detect these queries and address them appropriately.

A known state-of-the-art approach referred to as the kNN-WC algorithm for classifying controversy in Web documents is presented in S. Dori-Hacohen and J. Allan. *Automated controversy detection on the web.* Advances in Information Retrieval, Springer International Publishing, March 2015. However, this approach limits scope to those topics covered in a particular content source. Similarly, controversy detection studies often focus on certain genres or content sources, such as news, Twitter, and Wikipedia. Since these studies frequently use data-source-specific features such as Wikipedia's edit history features or Twitter's social graph information, existing work cannot be easily generalized to controversy detection on arbitrary webpages. To date, little effort has been made to directly model controversy with efficient detection of controversy.

Accordingly, there is a need for generalizing controversy detection of electronic content in order to automatically detect controversial topics and inform users about those controversial topics. The present invention satisfies this need.

SUMMARY OF THE INVENTION

The World Wide Web (WWW) is an excellent source for obtaining accurate and useful information for a huge number of topics, but it is also an excellent source for obtaining misguided, untrustworthy and biased information. To help users review webpage contents with a more balanced and critical view, alerting users that the topic of a webpage is controversial is a useful feature for a search engine.

The invention is directed to a model for controversy detection of electronic content, such as that found on the WWW. The invention is discussed with respect to Wikipedia as the content source, however any electronic content source is contemplated, for example, Facebook, Twitter, and any blog.

The invention provides a probabilistic framework to detect controversy on the WWW. The probabilistic framework incorporates language modeling. A language model is directed to a probability distribution over a collection of words. The ability to reliably detect the presence of controversy in search results could aid critical literacy and the ability to make real-life decisions.

The invention improves upon the current known state-of-the-art algorithm as k Nearest Neighbors of Wikipedia Controversy ("kNN-WC algorithm") currently known to identify whether a given WWW document discuses controversial topics. The kNN-WC algorithm assumes the controversy in a web document can be detected from the levels of controversy of related topics. The algorithm is used to model topics as related Wikipedia articles, and existing controversy labels on neighbors to derive a final judgment on the original document. Scores are generated that convey controversy in Wikipedia using information extracted from Wikipedia pages, meta-data, talk pages, and the page's edit history.

In particular, the kNN-WC algorithm consists of four steps: (1) find k Wikipedia neighbors given a webpage, (2) compute the three scores (D, C, and M) for each neighbor, (3) aggregate the k values of each score and turn them into three binary labels using thresholds, and (4) vote the labels and make a final decision. The kNN-WC algorithm has many limitations. First, kNN-WC is constrained by its dependency on Wikipedia controversy indicators, which are sourced solely from Wikipedia-specific features such as mutual reverts of editors. Second, the search of kNN for each document is a non-trivial operation, which raises practical efficiency issues. Lastly, topical coverage in Wikipedia is necessitated.

Improving upon the kNN-WC algorithm, the invention provides a probabilistic framework. This framework is developed for the controversy detection problem and recasts the state-of-the-art algorithm from that probabilistic perspective. This perspective is then used to extend prior work from a binary classification model to a probabilistic model that can be used for ranking.

In addition, the invention introduces a novel approach, using a controversy language model to address the controversy detection problem. The language-modeling approach is based on a quantitative analysis of controversy, which is more efficient and easier to compute than the more expensive Wikipedia-based controversy features for automated controversy detection. Empirically validating the language-modeling approach to automated controversy detection illustrates that the invention significantly outperforms the state-of-the-art algorithm for controversy detection.

A collection of documents gathered from a content source and a set of controversial documents are constructed from the collection. The set of controversial documents may be constructed using controversy scores on Wikipedia articles (using prior art approaches that are specific to Wikipedia), articles containing controversy-indicating words or articles containing words from one or more predefined lexicons. Controversy-indicating words may include, for example, "controversy", "saga", "dispute", or "scandal", although any word is contemplated.

The invention provides an equation to estimate P(C|D) representing a probability that D is controversial and P(NC|D) representing a probability that D is non-controversial. Using mathematical rules, the equation reduces to its final form:

$$\log P(D|C) - \log P(D|NC) > \alpha.$$

Two or more language models are formulated from a collection of documents and a set of controversial documents. These language models are used to estimate the probability of a document being controversial. Language models include a controversial language model ($L_C$) and a non-controversial language model ($L_{NC}$) according to:

$$P(w \mid L_C) = \frac{\sum_{d \in D_C} tf(w, d)}{\sum_{d \in D_C} |d|},$$

$$P(w \mid L_{NC}) = \frac{\sum_{d \in D_{BG}} tf(w, d)}{\sum_{d \in D_{BG}} |d|}$$

After the probabilities that document D is either controversial or non-controversial, the probabilities are compared and the result communicated to a user, such as via an application program interface (API) or a user interface.

These and other exemplary features and advantages of the present invention will become clear from the following description with reference to the accompanying drawings.

BRIEF DESCRIPTION OF THE DRAWINGS

The following drawings form part of the specification and are included to further demonstrate certain embodiments or various aspects of the invention. In some instances, embodiments of the invention can be best understood by referring to the accompanying drawings in combination with the presented detailed description. The description and accompanying drawings may highlight a certain specific example, or a certain aspect of the invention. However, one skilled in the art will understand that portions of the example or aspect may be used in combination with other examples or aspects of the invention.

FIG. 3 illustrates a table of results for language model approaches as compared to state-of-the-art kNN-WC algorithm.

FIG. 4 illustrates a table of results for language model approaches built from controversial-indicating words, depending on which documents are used to train the language model.

FIG. 5 illustrates a table of results for language model approaches built from controversial-indicating words and predefined lexicons.

FIG. 6 illustrates a table of results for language model approaches as compared to using predefined lexicons.

DETAILED DESCRIPTION OF THE INVENTION

The invention widens the scope of controversy detection to the entire WWW by providing a generalization of the kNN-WD algorithm to a probabilistic framework and departing from it to present a new language model to address the controversy detection problem. Specifically, a probabilistic model for ranking is provided by formulating the controversy detection problem with a probabilistic perspective and recasting the kNN-WC algorithm as obtaining a probability of controversy for binary classification. The kNN-WC algorithm is then extended for binary classification and the kNN-WC model derived. This model is a probabilistic model that can be used for ranking.

Figure 1A:
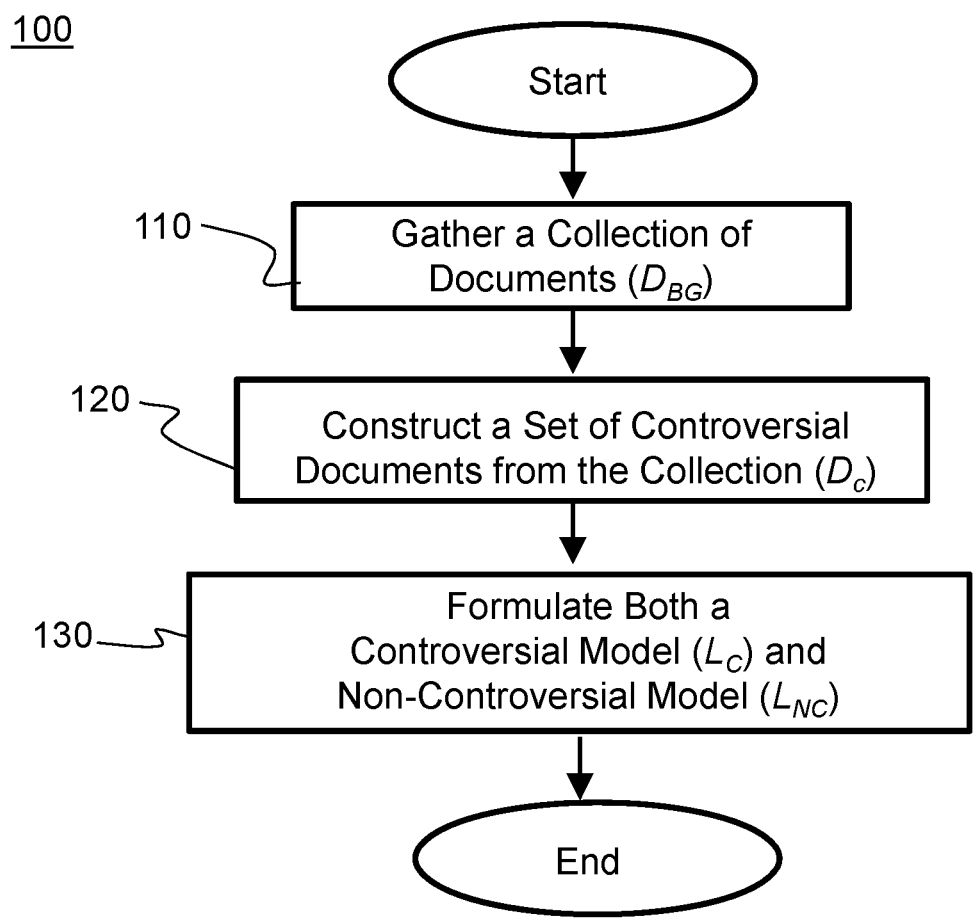
FIG. 1A illustrates a flow chart of a method for constructing language models according to the invention.

FIG. 1A illustrates a flow chart of a method for constructing language models according to the invention. As shown in FIG. 1A, the method 100 gathers a collection of documents ($D_{BG}$) from a content source at step 110. At step 120, a set of controversial documents from the collection ($D_c$) is constructed. The various ways in which the set may be constructed is further described in reference to FIGS. 2A-2C. At step 130, language models are formulated—both a controversial model ($L_C$) and non-controversial model ($L_{NC}$). The models are formulated from both the collection of documents ($D_{BG}$) and the set of controversial documents ($D_c$).

Figure 1B:
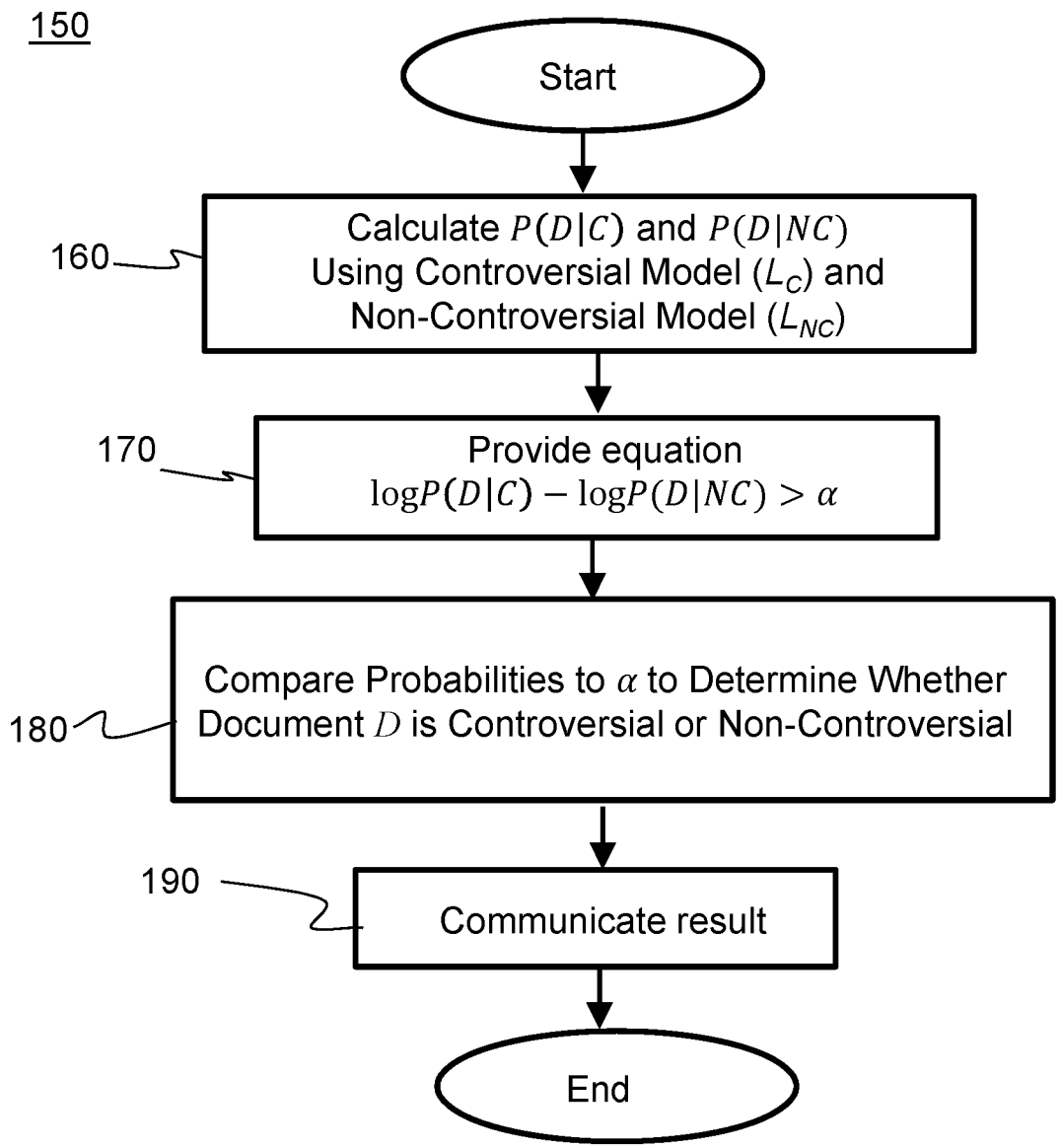
FIG. 1B illustrates a flow chart of a method for determining whether a certain document is controversial according to the invention.

FIG. 1B illustrates a flow chart of a method for determining whether a certain document is controversial according to the invention. At step 160, the language models formulated in step 130 of FIG. 1A are used to calculate probability (P) of the document (D) as being controversial ($D_c$) and non-controversial ($D_{NC}$). At step 170, an equation is provided to estimate P(C|D) representing a probability that D is controversial and P(NC|D), wherein one or more mathematical rules are applied to reduce an equation to the form:

$$\log P(D|C) - \log P(D|NC) > \alpha.$$

At step 180, the probabilities P(D|C) and P(D|NC) are compared to $\alpha$—a pre-computed threshold value—to determine whether the document (D) is controversial or non-controversial. If determined to be controversial, the result may be communicated at step 190 in the form of a warning to the user via a user interface such as a visual or audible alert (i.e., bright flashing warning symbol) across the particular webpage. Other forms of communicating the result may include an application program interface (API) which feeds the result to another program.

Figure 2A:
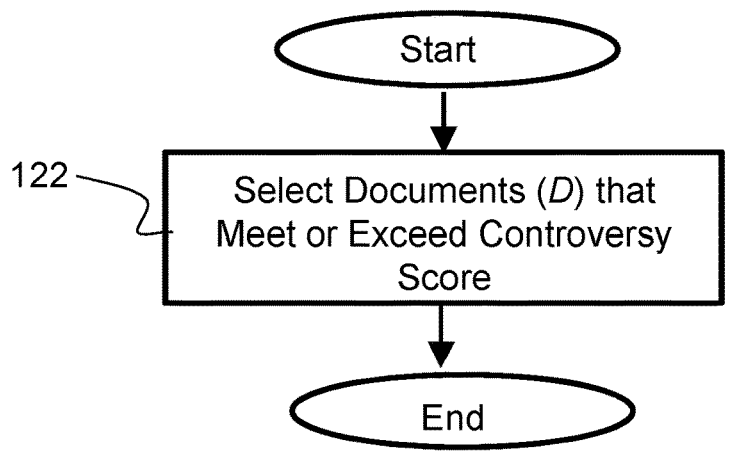
FIG. 2A illustrates a flow chart of one method for constructing a set of controversial documents from a collection according to the invention.
Figure 2B:
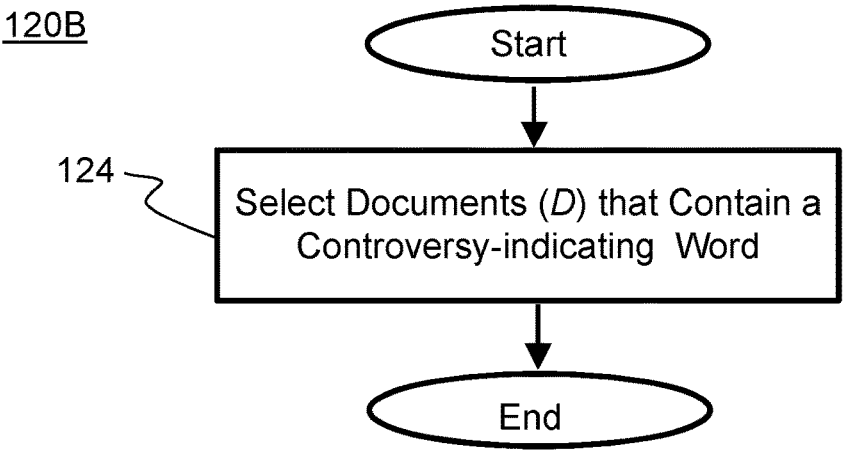
FIG. 2B illustrates a flow chart of another method for constructing a set of controversial documents from a collection according to the invention.
Figure 2C:
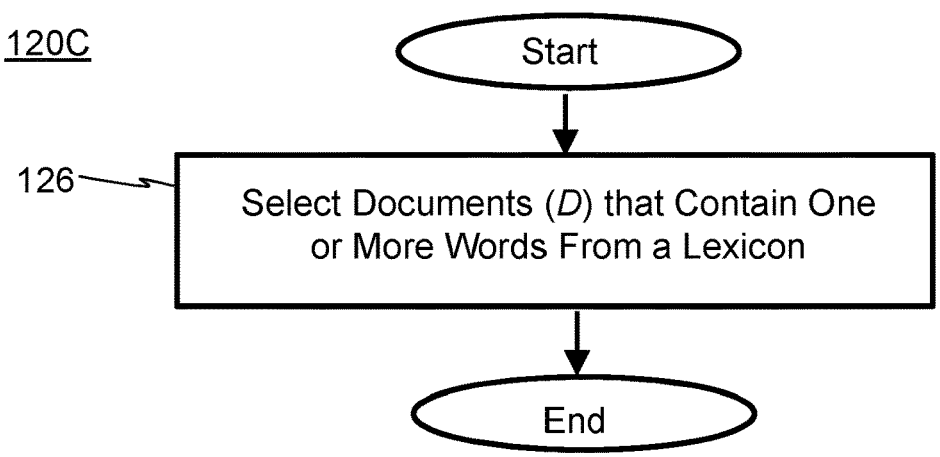
FIG. 2C illustrates a flow chart of yet another method for constructing a set of controversial documents from a collection according to the invention.

FIGS. 2A-2C each illustrate a flow chart of methods for constructing a set of controversial documents from a collection according to the invention. Documents (D) may be selected as controversial from the collection ($D_c$) in several different ways.

FIG. 2A illustrates a flow chart 120A of one method for constructing a set of controversial documents from a collection according to the invention. As shown at step 122, documents (D) are selected that meet or exceed a specified controversy score, for example, floating point numbers of various magnitudes (e.g., 2.72 . . . ).

FIG. 2B illustrates a flow chart 120B of another method for constructing a set of controversial documents from a collection according to the invention. At step 124, documents (D) are selected that contain a particular controversy-indicating word.

FIG. 2C illustrates a flow chart 120C of yet another method for constructing a set of controversial documents from a collection according to the invention. At step 126, documents (D) are selected that contain one or more words from a predefined lexicon. It is contemplated that any of the steps 122, 124, 126 may be performed alone or in any combination.

The invention formulates the controversy detection problem as obtaining the following probabilities: Let D be a document. P(C|D) is the probability that D is controversial. P(NC|D) is the probability that D is non-controversial. These two probabilities sum 1.

P(C|D) is represented by two components: (1) P(C,D) comprising a joint probability of controversy and D, and (2) P(D) comprising a prior probability of D. For binary classification, the interest is in whether P(C|D)>P(NC|D). However, P(D) is the same for P(C|D) and P(NC|D), such that it can be ignored in comparison. The approach of the kNN-WC algorithm is modeled by assuming that P(C|D) can be estimated from the joint probability P(C,D) by the following equation with the assumption that a document and its topics, denoted as $T_D$ are interchangeable:

$$P(C|D) = \frac{P(C,D)}{P(D)} \approx \frac{P(C,T_D)}{P(D)}$$

In the context of kNN-WC, Wikipedia neighbors are interpreted as a set of "latent topics" in the document. A set of similar Wikipedia articles to the document (i.e., neighbors) are denoted as $W_D$:

$$P(C,T_D) \approx P(C,W_D)$$

A set of similar documents ($W_D$) to the document D is found with the set of similar documents determined by a controversy score at step 220. By treating the Wikipedia neighbors as topics, P(C, $W_D$) can be modeled via controversy scores—D, C, and M.

Controversy scores may include Wikipedia controversy scores identified as a D score, a C score and a M score. The D score identifies the presence of the {dispute} tag placed on an article by its contributors. The D score is binary, i.e., 1 if the tag exists and −1 if it doesn't. The C score is generated by a regression-based method that trains on revisions that are labeled with {controversial} tags. It uses various metadata features of Wikipedia pages, such as a number of unique and anonymous contributors, length of the page and its associated talk page. The C score is floating point score in the range (0, 1). The M score is generated based on features of edits to predict the ferocity of an "edit war". Features include the number and reputation of the users involved in reverting each others' edits. The M score is a positive real number ranging from 0 to several billion.

By construction, the controversy score reflects some estimate of the co-occurrence of controversy and the topic. Likewise, the kNN-WC algorithm used a binary indicator function:

$$P(C,W_D) \approx c(W_D)$$

that outputs 1 (controversial) or 0 (non-controversial). One of the best performing settings of the kNN-WC is presented below:

$$c(W_D) = \mathbb{1}[\max(WCF_M(W_D) > \theta_M]$$

where $WCF_M(W_D)$ is a set of M scores for $W_D$, $\theta_M$ is a threshold, and $\mathbb{1}$ converts true to 1 and false to 0.

All controversy scores of each similar document of the set are aggregated represented by a function $f$. To support further evaluation of the kNN-WC model, the scoring function above is extended to a ranking by removing the threshold. Let $f(W_D)$ be a function that returns an aggregated value of the given neighbors' controversy scores—D, C, and M:

$$f(W_D) = \mathrm{agg}(WCF_{\{M,C,D\}}(W_D))$$

This aggregation function is converted to a probability by normalizing over all possible documents of the set ($W_D$) represented by a normalization factor (Z):

$$P(C|D) \approx \frac{1}{Z} f(W_D).$$

Outside of the context of kNN-WC, the invention formulates a more general probabilistic model that can be applied to any topic, including topics that have not been covered in Wikipedia. A document is considered controversial if the following equation is satisfied:

$$\frac{P(C|D)}{P(NC|D)} > 1$$

wherein each P(C|D) and P(NC|D) can be represented using Bayes theorem, which allows the consideration of the following odds-ratio:

$$\frac{P(C|D)}{P(NC|D)} = \frac{P(D|C)}{P(D|NC)} \cdot \frac{P(C)}{P(NC)} > 1$$

so that the test condition can be expressed as:

$$\frac{P(D|C)}{P(D|NC)} > \frac{P(NC)}{P(C)}$$

where the right-hand side is treated as a constant cutoff since it is independent of the document D, which can be learned with training data. To avoid underflow, the log of this ratio is calculated with a representing a pre-computed threshold value:

$$\log P(D|C) - \log P(D|NC) > \alpha$$

Hence only the probabilities P(D|C) and P(D|NC) have to be estimated. This can be done using the language modeling framework, construction of a language model of controversy $L_C$ and a non-controversial language model $L_{NC}$. A standard term independent assumption for each word (w) is made in the document (D), and zero probabilities with linear smoothing avoided. Both the general language model and the non-controversial language model is estimated as the set of all documents.

$$P(D|C) \approx P(D|L_C) = \prod_{w \in D} (\lambda P(w|L_C) + (1-\lambda) P(w|L_G))$$

$$P(D|NC) \approx P(D|L_{NC}) \approx P(D|L_G) = \prod_{w \in D} P(w|L_G)$$

Here, $D_C$ is a set of controversial documents, and $D_{NC}$ is a set of non-controversial documents, which are estimated in collections as the background collection. $D_{BG}$.

$$P(w|L_C) = \frac{\sum_{d \in D_C} tf(w,d)}{\sum_{d \in D_C} |d|}$$

$$P(w|L_{NC}) = \frac{\sum_{d \in D_{BG}} tf(w,d)}{\sum_{d \in D_{BG}} |d|}$$

Therefore, $D_C$ needs to be constructed in order to build a language model of controversy. Although the invention discloses three possible methods to do so, any method of constructing a controversial document set is contemplated. Both Wikipedia controversy scores—D, C, and M—controversy-indicative terms—patterns of text surrounding specific terms—and pre-defined lexicons can be used to construct $D_C$.

Using Wikipedia controversy scores, the top K Wikipedia articles are those that have high D, C, and M values.

Patterns of text surrounding specific terms such as "controversy", "dispute", "scandal", and "saga" have been found indicative of controversy. These patterns of text surrounding specific terms or the controversy scores, otherwise referred to as controversy-indicative terms, can be used to derive the language model. Using controversy-indicative terms, documents are retrieved by a query believed to indicate controversy. Controversy-indicative terms include not only those defined as "controversy", "dispute", "scandal", and "saga", but also those according to a predefined lexicon.

Models according to the probabilistic framework are evaluated. According to a particular evaluation, a dataset is leveraged that consists of judgement for 303 webpages from a content source, i.e., ClueWeb09. Five-fold cross-validation is performed and measures on the reconstructed test set is reported. Rather than use the full text of the web pages, we follow the kNN-WC algorithm and use the "TF10" query, where the document is approximated by the ten most frequent terms. In order to construct Dc, long abstracts were leveraged from a content source, i.e., DBPedia. Results are presented in FIG. 3 through FIG. 6 using the Area Under Curve (AUC) measure, since performance can be compared without tuning thresholds.

Accuracy is explored as a measure as well. Compared to kNN-WC algorithm, improvement is seen from 0.72 accuracy to 0.779, significant at the p<0.001 level. For statistical significance tests, confidence intervals are obtained from bootstrap resamples of the predictions. For each fold, two parameters are trained by grid search: K, the number of top documents to choose, and A, the smoothing parameter. For example, to create the M-score-based language model the documents are ranked in the Wikipedia collection by their M score, and derived a language model based on the concatenation of the top K documents. These language models are compared to the kNN-WC algorithm as presented in FIG. 3.

For building language models based on controversial-indicating words, where the relevant document sets were created by a textual ranking given a query, the Galago search engine was used to rank documents using a query-likelihood retrieval. Six different corpora as document sources: DBPedia, ClueWeb09, Reuters, NYT-LDC, Robust04, Signal-1M. Collection size |C| is in millions of documents and type shown for comparison of results. The K highest-scoring documents were then used as the controversial document set: $D_C$. These results are presented in FIG. 4.

In FIG. 5 and FIG. 6, manually-curated or predefined lexicons for controversy tasks are reviewed. Retrieving Wikipedia articles with claims about controversial query topics is identified as "Roitman" and using crowdsourcing to label controversial words is identified to as "Mejova". Their use is intrinsically explored, with Jaccard Similarity in FIG. 5 and as queries to build a language model in FIG. 6. As seen in FIG. 5, "controversy" is the most indicative term, and "saga" is no better than random. Combining terms leads to no improvement over "controversy" alone. As seen in in FIG. 6, a comparison of (predefined) lexicons built manually ("Roitman") and through crowd-sourcing ("Mejova) to the automatically derived language models using controversy scores ("WCF") or controversy-indicating words ("Cramer") indicates significant improvement over the best lexicon approach.

Figure 7:
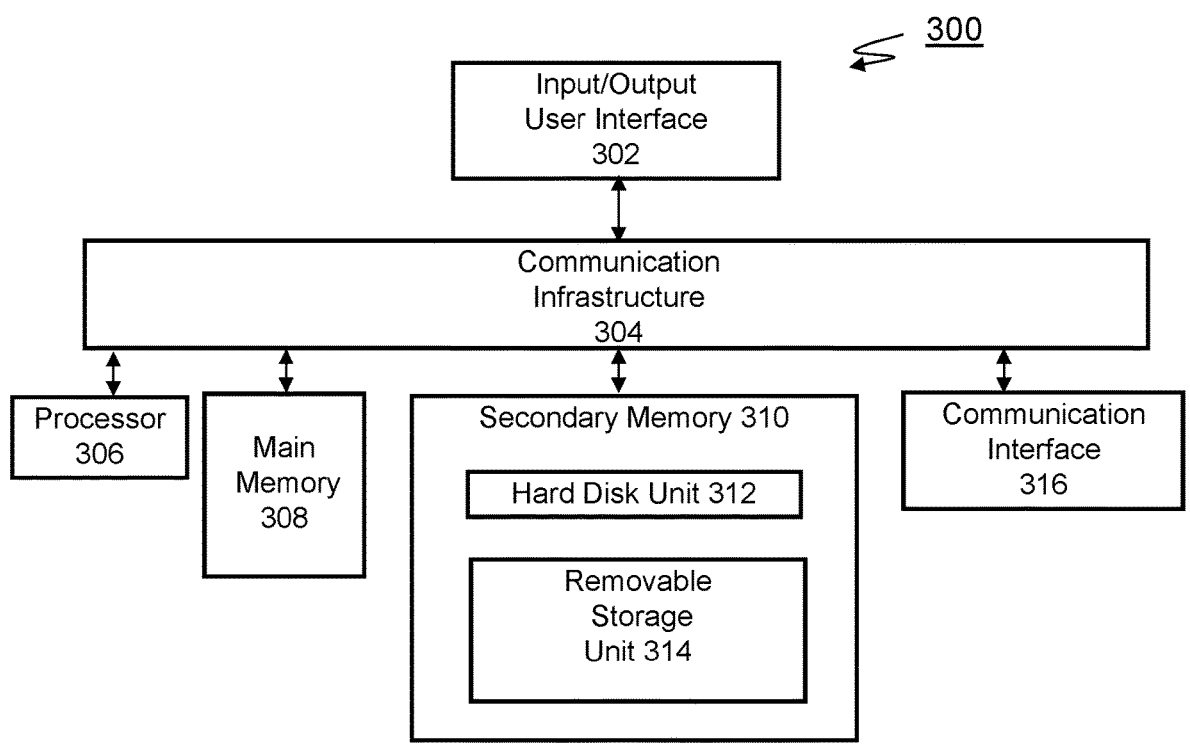
FIG. 7 illustrates an exemplary computer system that may be used to implement the invention.

FIG. 7 illustrates an exemplary computer system 300 that may be used to implement the methods according to the invention.

Computer system 300 includes an input/output user interface 302 connected to communication infrastructure 304—such as a bus—, which forwards data such as graphics, text, and information, from the communication infrastructure 304 or from a frame buffer (not shown) to other components of the computer system 300. The input/output interface user 302 may be, for example, a display device, a keyboard, touch screen, joystick, trackball, mouse, monitor, speaker, printer, Google Glass® unit, web camera, application program interface (API), any other computer peripheral device, or any combination thereof, capable of entering and/or viewing data.

Computer system 300 includes one or more processors 306, which may be a special purpose or a general-purpose digital signal processor configured to process certain information. Computer system 300 also includes a main memory 308, for example random access memory (RAM), read-only memory (ROM), mass storage device, or any combination thereof. Computer system 300 may also include a secondary memory 310 such as a hard disk unit 312, a removable storage unit 314, or any combination thereof. Computer system 300 may also include a communication interface 316, for example, a modem, a network interface (such as an Ethernet card or Ethernet cable), a communication port, a PCMCIA slot and card, wired or wireless systems (such as Wi-Fi, Bluetooth, Infrared), local area networks, wide area networks, intranets, etc.

It is contemplated that the main memory 308, secondary memory 310, communication interface 316, or a combination thereof, function as a computer usable storage medium, otherwise referred to as a computer readable storage medium, to store and/or access computer software including computer instructions. For example, computer programs or other instructions may be loaded into the computer system 300 such as through a removable storage device, for example, a floppy disk, ZIP disks, magnetic tape, portable flash drive, optical disk such as a CD or DVD or Blu-ray, Micro-Electro-Mechanical Systems (MEMS), nanotechnological apparatus. Specifically, computer software including computer instructions may be transferred from the removable storage unit 314 or hard disc unit 312 to the secondary memory 310 or through the communication infrastructure 304 to the main memory 308 of the computer system 300.

Communication interface 316 allows software, instructions and data to be transferred between the computer system 300 and external devices or external networks. Software, instructions, and/or data transferred by the communication interface 316 are typically in the form of signals that may be electronic, electromagnetic, optical or other signals capable of being sent and received by the communication interface 316. Signals may be sent and received using wire or cable, fiber optics, a phone line, a cellular phone link, a Radio Frequency (RF) link, wireless link, or other communication channels.

Computer programs, when executed, enable the computer system 300, particularly the processor 306, to implement the methods of the invention according to computer software including instructions.

The computer system 300 described may perform any one of, or any combination of, the steps of any of the methods according to the invention. It is also contemplated that the methods according to the invention may be performed automatically.

The computer system 300 of FIG. 7 is provided only for purposes of illustration, such that the invention is not limited to this specific embodiment. It is appreciated that a person skilled in the relevant art knows how to program and implement the invention using any computer system.

The computer system 300 may be a handheld device and include any small-sized computer device including, for example, a personal digital assistant (PDA), smart hand-held computing device, cellular telephone, or a laptop or netbook computer, hand held console or MP3 player, tablet, or similar hand-held computer device, such as an iPad®, iPad Touch® or iPhone®.

While the disclosure is susceptible to various modifications and alternative forms, specific exemplary embodiments of the invention have been shown by way of example in the drawings and have been described in detail. It should be understood, however, that there is no intent to limit the disclosure to the particular embodiments disclosed, but on the contrary, the intention is to cover all modifications, equivalents, and alternatives falling within the scope of the disclosure as defined by the appended claims.

The invention claimed is:

1. A method for automatically detecting controversy in electronic content, comprising the steps of:

gathering by a processor a collection of documents ($D_{BG}$) from a content source;

constructing by the processor a set of controversial documents ($D_c$) from the collection;

formulating one or more language models from both the collection of documents ($D_{BG}$) and the set of controversial documents ($D_c$), wherein a language model includes a controversial language model ($L_C$) and a non-controversial language model ($L_{NC}$);

calculating by a processor the probability (P) of each document (D) being controversial P(D|C) and a probability of each document being non-controversial P(D|NC) using the controversial language model ($L_C$) and the non-controversial language model ($L_{NC}$);

providing by the processor an equation to estimate P(C|D) representing a probability that D is controversial and P(NC|D) representing a probability that D is non-controversial, wherein the providing step includes the step of applying one or more mathematical rules to reduce an equation to the form:

$$\log P(D|C) - \log P(D|NC) > \alpha,$$

wherein $\alpha$ represents a pre-computed threshold value.

comparing the probabilities P(D|C) and P(D|NC) to $\alpha$ to determine whether the document (D) is controversial or non-controversial; and communicating by the processor to a user interface or an application program interface (API) whether or not the document is controversial.

2. The method of claim 1, wherein the language model is computed directly from the set of controversial documents ($D_c$).

3. The method of claim 2, wherein the controversy score of the selecting step is any method to score controversy in Wikipedia, including but not limited to one or more selected from the group of: (1) a D score predicting controversy using a dispute tag assigned to the document by a contributor, (2) a C score predicting controversy from metadata features of the document, and (3) a M score predicting controversy based on a number and a reputation of contributors to the document.

4. The method of claim 3, wherein the one or more controversy indicating words are selected from the group of words comprising: "controversy", "saga", "dispute", or "scandal".

5. The method of claim 1, wherein the set of controversial documents ($D_c$) is constructed from one or more documents selected from the collection when the controversy score of the selected document meets or exceeds a specified controversy score.

6. The method of claim 1, wherein the set of controversial documents ($D_c$) is constructed from one or more documents selected from the collection that contain one or more controversy indicating words.

7. The method of claim 1, wherein the set of controversial documents ($D_c$) is constructed from one or more documents selected from the collection that include one or more words of a predefined lexicon.

8. The method of claim 1, wherein the controversial language model ($L_C$) is represented by the equation:

$$P(w \mid L_C) = \frac{\sum_{d \in D_C} tf(w, d)}{\sum_{d \in D_C} |d|}$$

wherein P represents probability, w represents a word, d represents a document, $D_c$ represents a set of controversial documents, and tf(w,d) represents term frequency of word w in document d.

9. The method of claim 1, wherein the non-controversial language model ($L_{NC}$) is represented by the equation:

$$P(w \mid L_{NC}) = \frac{\sum_{d \in D_{BG}} tf(w, d)}{\sum_{d \in D_{BG}} |d|}$$

wherein P represents probability, w represents a word, d represents a document, $D_{BS}$ represents a collection of documents, tf(w,d) represents term frequency of word w in document d.

10. The method of claim 1, wherein the comparing step determines the document is controversial when the following equation is satisfied:

$$\frac{P(C \mid D)}{P(NC \mid D)} > 1.$$

11. The method of claim 1, wherein the content source is an online encyclopedia comprising Wikipedia, or a collection of news articles.

12. The method of claim 1, wherein the mathematical reduction comprises:

using Bayes theorem to represent P(C|D) and P(NC|D) to consider an odds-ratio:

$$\frac{P(C \mid D)}{P(NC \mid D)} = \frac{P(D \mid C)}{P(D \mid NC)} \cdot \frac{P(C)}{P(NC)} > 1$$

wherein the odds-ratio is provided by:

$$\frac{P(D \mid C)}{P(D \mid NC)} > \frac{P(NC)}{P(C)}.$$

* * * * *

UNITED STATES PATENT AND TRADEMARK OFFICE
CERTIFICATE OF CORRECTION

| | | |
|---|---|---|
| PATENT NO. | : 10,949,620 B2 | Page 1 of 1 |
| APPLICATION NO. | : 16/339234 | |
| DATED | : March 16, 2021 | |
| INVENTOR(S) | : Shiri Dori-Hacohen et al. | |

It is certified that error appears in the above-identified patent and that said Letters Patent is hereby corrected as shown below:

In the Claims

In Claim 1, Column 10, at Line 32, delete "a processor" and insert --the processor--

In Claim 1, Column 10, at Line 32, delete "the probability" and replace with --a probability--

In Claim 9, Column 12, at Line 2, delete "$D_{BS}$" and insert --$D_{BG}$--

Signed and Sealed this
Eighth Day of June, 2021

Drew Hirshfeld
*Performing the Functions and Duties of the*
*Under Secretary of Commerce for Intellectual Property and*
*Director of the United States Patent and Trademark Office*